(12) United States Patent
Boas

(10) Patent No.: US 10,220,902 B2
(45) Date of Patent: Mar. 5, 2019

(54) FASTENING AND/OR LOCKING SYSTEM

(71) Applicant: ORTLIEB SPORTARTIKEL GMBH, Heilsbronn (DE)

(72) Inventor: Günter Boas, Heilsbronn (DE)

(73) Assignee: ORTLIEB SPORTARTIKEL GMBH, Heilsbronn (DE)

(*) Notice: Subject to any disclaimer, the term of this patent is extended or adjusted under 35 U.S.C. 154(b) by 0 days.

(21) Appl. No.: 15/750,870

(22) PCT Filed: Jul. 19, 2016

(86) PCT No.: PCT/DE2016/000285
§ 371 (c)(1),
(2) Date: Feb. 7, 2018

(87) PCT Pub. No.: WO2017/032353
PCT Pub. Date: Mar. 2, 2017

(65) Prior Publication Data
US 2018/0229792 A1 Aug. 16, 2018

(30) Foreign Application Priority Data
Aug. 24, 2015 (DE) .................... 20 2015 005 852 U

(51) Int. Cl.
*F16M 11/00* (2006.01)
*B62J 7/08* (2006.01)
*B62J 9/00* (2006.01)

(52) U.S. Cl.
CPC ... *B62J 7/08* (2013.01); *B62J 9/00* (2013.01)

(58) Field of Classification Search
None
See application file for complete search history.

(56) References Cited

U.S. PATENT DOCUMENTS 10,124,848 B2 * 11/2018 Boas .................. B62J 7/08
2011/0227187 A1 9/2011 Oonishi

FOREIGN PATENT DOCUMENTS

DE         4041460       6/1992
DE    20 2006 017966     2/2007
(Continued)

OTHER PUBLICATIONS

PCT/DE2016/000285, International Search Report dated Jun. 12, 2016, 2 pages—English, 4 pages—German.
(Continued)

*Primary Examiner* — Amy J. Sterling
(74) *Attorney, Agent, or Firm* — Lackenbach Siegel, LLP; Andrew F. Young

(57) ABSTRACT

A fastening locking system for containers on an attachment device having attachment points includes correspond receiving elements arranged on a container and detachably fasten the container to the carrier in a defined position by means of at least one lower guide element attached on the rear side of the container and by means of two upper receiving elements attached to the rear side of container, wherein the two receiving elements attached in the upper region to the rear side of the container are arranged along an arc path and each have a continuous guide groove, following the arc path, and include a projection for receiving a mushroom-shaped attachment means, which is arranged on the luggage carrier, wherein each receiving element is equipped with a spring-loaded tilting lever mounted for rotation about an axis and one end of each tilting lever extends in the direction of the top edge of the bag or container and the other beveled end oriented in one direction extends into the guide groove with the projection of the receiving element and can be displaced only in one direction against the spring force by means of a (Continued)

mushroom-shaped attachment means that can be pushed through.

12 Claims, 2 Drawing Sheets

(56) References Cited

FOREIGN PATENT DOCUMENTS

| DE | 20 2008 013186 | 3/2009 |
|----|----------------|--------|
| DE | 20 2014 009305 | 1/2015 |
| WO | WO 2006/086948 | 8/2006 |

OTHER PUBLICATIONS

PCT/DE2016/000285, Written Opinion dated Jun. 12, 2016, 4 pages—German, 2 pages—English.

* cited by examiner

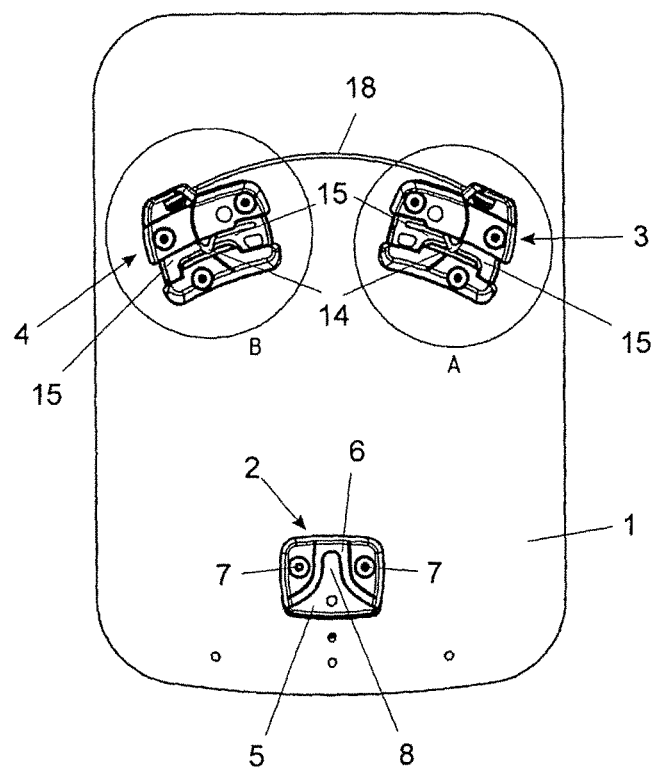
Fig. 1
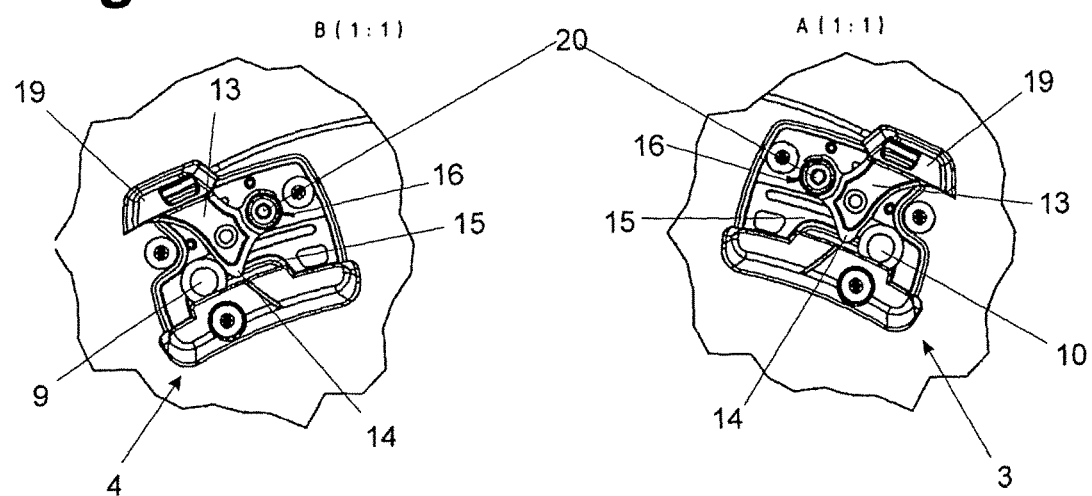
Fig. 2
Fig. 3

FASTENING AND/OR LOCKING SYSTEM

CROSS REFERENCE TO RELATED APPLICATIONS

This application relates to, and claims priority from PCT Ser. No.: PCT/DE2016/000285 filed Jul. 19, 2016 the entire contents of which are incorporated herein by reference, which in turn claims priority from DE Ser. No. 20 2015 005 852.3 filed Aug. 24, 2015.

FIGURE SELECTED FOR PUBLICATION

FIG. 1

BACKGROUND OF THE INVENTION

Field of the Invention

The present invention relates to a fastening and/or locking system for the attaching of containers to an attachment device, in particular to a carrier such as a luggage carrier, in which attachment elements are attached to the carrier or to an accessory for the carrier and engage into receiving elements, which are attached to a container and/or are connected therewith, and is detachably locked therewith. Such a luggage carrier may be used on a transportation device.

Description of the Related Art

For carrying along containers such as bags, cases, rucksacks or suchlike on a two-wheeled vehicle or generally on a carrier, various systems are known in order to connect bags or other containers to the carrier, in particular luggage carrier, or respectively to attach them thereto. Systems in which the bags can be attached, adjusted in a detachable and simple manner to a luggage carrier and removed again enjoy particular popularity.

Such an embodiment is disclosed for example in DE 4041460A1, which shows a bag with a rail arranged on its rear side, which rail is equipped with hooks by means of which the bag can be hung into the upper strut of a luggage carrier. Such rails are designed in innovations as detent- or swivel hooks and lock the attachment. These variants also require very large, stable hooks or hooks with large deflections.

Also in DE 202006017966U1 a variant for such an attachment of containers to a luggage carrier is shown, in which two hooks are securely attached to the rear side of the bag and by means of which the bag can be attached to a luggage carrier.

As a holding device for the attaching of containers, carriers which are specifically prepared for this, in particular luggage carriers, are known, which have securely attached fastening points for containers, such as e.g. bags. By way of example, WO 2006/086948A1 is to be named here, in which a luggage carrier is shown, which is equipped with mushroom-shaped attachment elements for the attaching of a container.

The receiving points provided on the luggage carrier for corresponding counter-pieces on bags are also designed in innovations as subsequently mountable elements for mounting on a luggage carrier, whereby the entire luggage carrier is not required as an accessory.

In the known systems, the attaching of the bag or of another container to a lug-gage carrier takes place by means of receiving points attached to the bag, which are brought into engagement with the attachment points on a carrier or respectively luggage carrier. The embodiments of receiving points or elements which are used on bags are e.g., hooks attached or applied on the rear side of the bag, which are able to be brought into engagement with elements on the luggage carrier. Rails are also known, which are attached to the rear side of the bag and have at least one hook mechanism by which this is attached to at least one attachment element on the luggage carrier.

In several attachment methods for the mounting and attaching of containers to a carrier, the need to have to hold the bag precisely via several points during hanging in order to then on lowering of the bag or the container simultaneously bring the receiving points on the bag or of the container into engagement with the attachment points on the carrier, in which these engage, is regarded as disadvantageous or uncomfortable with regard to handling. This is difficult for many users, in particular when the bag or the container is full and thus has a greater weight, and the holding of the high load in an exact position is very uncomfortable. Advantageously, on the other hand, DE 2020140093505.9 shows a locking device for bags on a luggage carrier with mushroom-shaped receiving points, which permits the attaching of the bag very simply by placing in only one guide point, and subsequent folding in or turning in of the bag. In the said folding in or swiveling in, the bag is fastened, which takes place by engaging of the mushroom-shaped elements, present on the luggage carrier, into receiving plates, provided for this, on the rear side of the bag. On swiveling in and locking, the bag additionally moves slightly, aided by its weight, slightly downwards, and grooves in the receiving plates securely receive the mushroom-shaped elements of the luggage carrier on lowering of the bag.

The handling during removal of the bag or container from a carrier is regarded as a further point of criticism in known attachment methods for the mounting and attaching of containers on a carrier, because in so doing in addition to the lifting of the bag, also at the same time an unlocking element must be actuated, which very often necessitates an operation by both hands. This is also the case in the already improved embodiment according to DE 202014009305.9, because here the bag, on removing, must be lifted upwards at least so far that the mushroom-shaped attachment elements leave the grooves of the receiving plates on the rear side of the bag or container, or respectively can exit therefrom.

ASPECTS AND SUMMARY OF THE INVENTION

It is an object of the present invention to provide a holding device for the attaching of containers to a carrier, in particular for the attaching of panniers or similar containers to a two-wheeled vehicle or respectively to a luggage carrier, which are further improved with regard to handling and which in particular make the removing of the bag from the luggage carrier able to be handled more easily. In particular, the embodiment of smooth or respectively flat pockets on the rear side is to be possible, and the handling on hanging or removing the bag or container from a luggage carrier is to be facilitated.

This problem is solved by the features of the characterizing section of the claims herein. Further developments and advantageous embodiments of the invention are comprised in the overall disclosure herein.

In accordance with the invention is an attachment, fastening and/or locking system for containers on an attachment device, in particular on a carrier such as a luggage carrier on which attachment points are attached and/or can be positioned, which correspond with receiving elements arranged on a bag or a container and detachably fasten the bag or the container to the carrier in a defined position by means of at least one lower guide element attached on the rear side of the bag or container and by means of two upper receiving elements attached to the rear side of the bag or container, wherein the two receiving elements attached at the top to the rear side of the bag or container are arranged along a circular path and are designed with a substantially continuous guide groove, following the circular path, comprising a projection for receiving a mushroom-shaped attachment means, which is arranged on the luggage carrier, wherein each receiving element is equipped with a spring-loaded tilting lever mounted for rotation about an axis and one end of each tilting lever extends in the direction of the top edge of the bag or container and the other beveled end oriented in one direction extends into the guide groove with the projection of the receiving element and can be displaced only in one direction against the spring force by means of a mushroom-shaped attachment means that can be pushed through.

The receiving elements and the attachment means are arranged along a circular path of the lower attachment means with the radius to the upper attachment means. On introducing of the guide element attached in the lower region of a rear side of the bag into the lower attachment element arranged on a luggage carrier, a groove of the guide element slides over the enlarged diameter of the attachment element, which is embodied in a mushroom shape. In so doing, the bag is held rotatably at the corresponding point by the lower attachment element with the guide element. The two upper attachment elements on the luggage carrier are arranged at the same distance with respect to the lower attachment point, and the two upper receiving elements on the rear side of the bag are arranged along this circular path.

The two upper receiving elements are designed here in mirror image in the arrangement of the rotatably mounted tilting lever, which leads to respectively a left-hand or a right-hand upper receiving element, in which a mushroom-shaped attachment enters into the groove, being able to be guided past the attachment means only in one direction.

A correspondingly left-hand receiving element is designed such that a mushroom-shaped attachment means, guided in the groove, oriented from right to left, lifts the beveled end of the spring-loaded tilting lever and passes the lever end and the lever end, configured in a blunt manner, blocks by means of the spring force the mushroom-shaped attachment means, running in the groove, against a back-orientation towards the right.

A correspondingly right-hand receiving element is designed, on the other hand, such that a mushroom-shaped attachment means, guided in the groove, oriented from left to right, lifts the beveled end of the spring-loaded tilting lever and passes the lever end and the lever end, configured in a blunt manner, blocks by means of the spring force the mushroom-shaped attachment means, running in the groove, against a back-orientation towards the left.

With this embodiment of right-hand and left-hand receiving elements arranged on the rear side of the bag, it is possible to firstly introduce a bag with its guide element into the lower attachment element, where it is already held but remains tillable. Thereafter, the bag is to be tilted so far that one of the receiving elements reaches a position between the distance of the two upper attachment means which are positioned on the luggage carrier. The bag can then be swiveled to the right or to the left with slight pressure in the direction of the luggage carrier, wherein the grooves of the guide elements move into the mushroom-shaped attachment elements and embrace the enlarged heads. Preferably, the arrangement of the receiving elements on the rear side of the bag is arranged such that the bag, on tilting forward of the bag, is attached. In so doing, a bag arranged on the right on the luggage carrier, on tilting forward, is fastened with its right-hand receiving element, viewed from the rear, which moves into the attachment element which is arranged further to the rear on the luggage carrier. On the tilting forward of the bag, the tilting lever of the right-hand receiving element is pressed away here upwards from the attachment element against the spring force, and subsequently blocks the path for the swiveling back of the bag towards the rear.

The tilting lever of the correspondingly left-hand receiving element, on the other hand, is designed and arranged such that the advancing of the mushroom-shaped attachment element is blocked by the tilting lever in a defined position. The position here is the desired hanging position of the bag on the luggage carrier in which the left-hand receiving element blocks a further tilting of the bag towards the front and the right-hand receiving element locks the mushroom-shaped attachment element precisely in the position behind the tilting lever, which is pressed away against the spring force.

In this hanging position, the bag is fastened and locked on the luggage carrier and cannot detach itself either by tilting forward, toward the rear or by lifting from the luggage carrier.

The two upper ends of the tilting levers are preferably equipped with a handle, to be jointly operated, which on actuation thereof rotate the two tilting levers simultaneously in opposite directions. In so doing, respectively the lower ends of the tilting levers are swiveled out from the grooves by their beveled ends, oriented in one direction, whereby any blocking of the movement of the mushroom-shaped attachment elements in the grooves of the receiving devices is released. In this handle-actuated position, cancelling the blocking, the bag can be easily tilted forward or toward the rear and released, without, in so doing, having to lift the bag. Subsequently, the bag can also be removed from the guidance of the lower guide element into the lower attachment element arranged on the luggage carrier.

In a variant embodiment, the handle for actuating the receiving elements can be embodied as a cable pull, the latter can be configured as a grip of the bag or can be connected therewith as a handle or can be embodied so as to be articulated therewith.

In a preferred embodiment of the invention, the two elements designed as right-hand and/or left-hand receiving device are formed from a base plate, preferably connected directly in a water-tight manner to the rear side of the bag, and from the lever element with a spring, preferably embodied as a leg spring, from the corresponding tilting lever and from a cover plate. The cover plate is preferably able to be screwed onto and/or against the base plate and at least partially covers the upper region of the tilting lever and forms a portion of the groove projection on which the enlarged region of the mushroom-shaped attachment means is gripped.

In a particularly preferred embodiment, respectively the base plates of the lower guide element and the base plates of the two upper, left-hand and right-hand receiving devices are welded in a water-tight manner to the rear side of the bag.

For better introducing and sliding in of the attachment elements into the guide device and/or the receiving devices, according to an embodiment of the invention these are equipped with run-up chamfers.

The above and other aspects, features and advantages of the present invention will become apparent from the following description read in conjunction with the accompanying drawings, in which like reference numerals designate the same elements.

BRIEF DESCRIPTION OF THE DRAWINGS

FIG. 1 is a rear side of a bag with lower guide element and right-hand (A) and left-hand (B) receiving element.

FIG. 2 an enlarged illustration of the left-hand receiving element (B) with the cover removed showing one further mushroom-shaped attachment means arranged further above on a luggage carrier (shown in combination).

FIG. 3 an enlarged illustration of the right-hand receiving element (A) with the cover removed and also showing one further mushroom-shaped attachment means arranged further on a luggage carrier shown in combination.

DETAILED DESCRIPTION OF THE PREFERRED EMBODIMENTS

Figure 4:
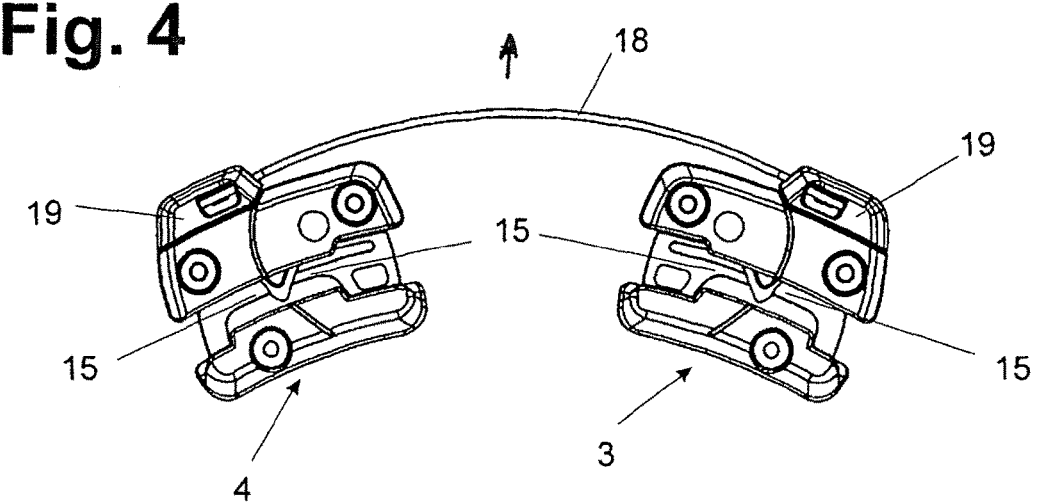
FIG. 4 a view of the two receiving elements with shared handle.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

In the present text, numerous specific details are set forth in order to provide a thorough understanding of exemplary versions of the present invention. It will be apparent, however, to one skilled in the art, that some versions of the present invention may possibly be practiced without some of these specific details. Indeed, reference in this specification to "a variant," "variants," and "one/the variant," or "one version," "a version" and the like, should be understood to mean that a particular feature, structure, or characteristic described in connection with the variant or version is included in at least one such variant or version according to the disclosure. Thus, the appearances of phrases such as "in one variant," "in one version," and the like, in various places in the specification are not necessarily all referring to the same version or variant, nor are separate or alternative versions or variants mutually exclusive of other versions or variants. Moreover, various features may be described which possibly may be exhibited by some variants or versions and not by others. Similarly, various requirements are described which may be requirements for some variants or versions, but not others. Furthermore, as used throughout this specification, the terms 'a', 'an', 'at least' do not denote a limitation of quantity, but rather denote the presence of at least one of the referenced item, in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

Various operations may be described as multiple discrete operations in turn, in a manner that may be helpful in understanding embodiments of the present invention; however, the order of description should not be construed to imply that these operations are order dependent.

In FIG. 1 the rear side of a bag or container 1 is shown symbolically, which is equipped with a lower guide element 2 and with a right-hand 3 and a left-hand 4 receiving element arranged thereabove. In the embodiment which is shown, the base plate 5 of the guide element 2 is welded directly to the rear side of the bag 1 and a cover 6 is screwed on the base plate 5 by means of screws 7. The cover 6 has a certain thickness and therefore achieves an intermediate space over the base plate 5 and has, furthermore, a groove 8 with run-up chamfers. The bag can be introduced into this groove with the guide element 2 into a mushroom-shaped attachment element, which is attached to luggage carrier, and is in so doing firstly rotatable about this point by tilting of the bag toward the front and/or rear parallel to the luggage carrier.

On the luggage carrier (not shown), in addition to this lower mushroom-shaped attachment means, two further mushroom-shaped attachment means 9, 10 are arranged further above on the luggage carrier (not shown) but the mushroom-shaped attachment means are shown (FIGS. 2, 3) in respective grooves 15 on each receiving element. The two upper mushroom-shaped attachment means 9, 10 arranged on the luggage carrier are then brought into connection with the receiving elements 3, 4 on attaching the bag on the luggage carrier and are held and/or locked and/or fastened in these.

Figure 5:
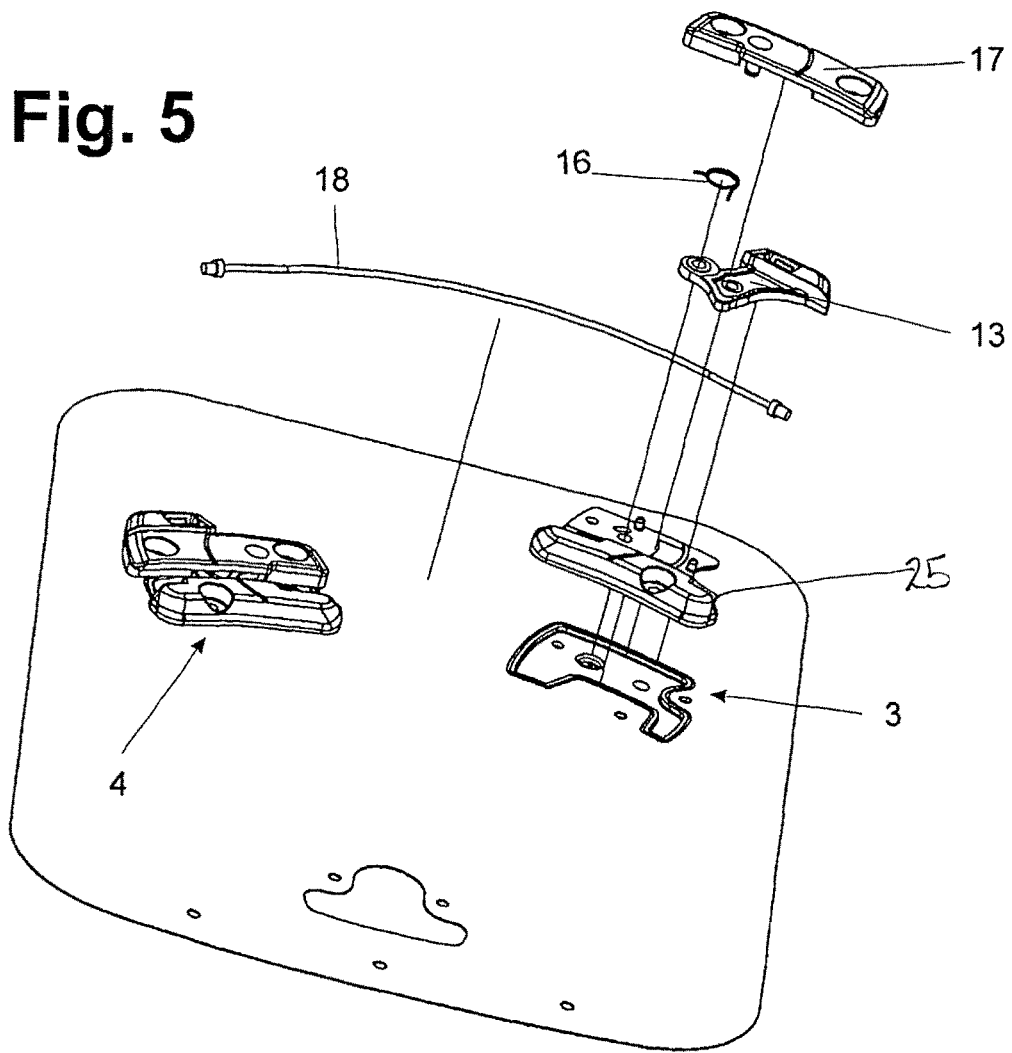
FIG. 5 an assembly view of the receiving elements on the rear side of the bag.

The two receiving elements 3, 4, as are to be seen in FIGS. 2, 3, 4 and 5, are configured as right-hand receiving element 3 and left-hand receiving element 4, wherein respectively the rotation axes 12 for the tilting levers 13 are arranged laterally reversed in the base plates 11 of the receiving elements 3, 4. Thereby, a receiving element can be inserted respectively only in one direction into an attachment means, in the respectively other direction the lower, projecting end 14 of the tilting lever blocks this movement.

For example, the left-hand receiving element 4, as shown in FIG. 2 under B, cannot be moved toward the left against a mushroom-shaped attachment element 9 shown in groove 15, here the end 14 of the tilting lever 13, which is mounted around the rotation axis 12, blocks the movement of the receiving element 4 via the attachment means 9. The tilting lever 13 in the left-hand receiving element 4 can only be moved rotating to the right against the spring force of an spring 16, in this position which is shown, the end of the tilting lever locks.

If the attachment means 9 in FIG. 2 were on the right-hand side of the end 14 of the tilting lever 13, the receiving element 4 could be moved towards the right with the attachment element 9 guided in the groove 15, and the attachment means would press away upwards the end 14 of the rotatably mounted tilting lever 13 against the spring force of the spring 16. After passing through, the end of the tilting lever would block a back movement behind the attachment means.

In FIG. 3, on the other hand, the attachment means 10 is already positioned by passing through in the groove behind the end 14 of the tilting lever and is blocked in this position. The illustrations in viewing together FIG. 2 with FIG. 3 show a hanging position of the bag on a luggage carrier.

The bag, the lower guide element 2 of which was firstly introduced into a lower attachment means positioned on the right on a luggage carrier, is firstly tiltable rotatably about this point. The bag is now held so that the right-hand receiving element 3, shown in FIG. 3, on tilting is guided in the direction of travel, therefore toward the front, from right to left via the attachment means 10. The lower end 14 of the tilting lever 13, rotating to the left according to FIG. 3, is pressed upwards against the spring force, the receiving element can be guided via the attachment means 10 and the end 14 of the tilting lever 13 moves back directly behind the attachment means 10 and blocks the movement of the receiving element 3 in the direction to the right.

On the introduction and moving through of the attachment means 10 through the movement of the receiving element 3 toward the left, at the same time the receiving means 4 moves in the direction of the attachment means 9 and is caught by the groove 15 until it is blocked at the lower end 14 of the tilting lever 13, arranged rotating to the right, as illustrated in FIG. 2.

In this position, as shown in viewing together FIG. 2 and FIG. 3, the bag is fastened in its hanging position, it can slide neither downwards, because it rests there with the guide element 2 in the lower attachment means, nor can it pivot away towards the left or right, because here respectively an end of a tilting lever prevents the tilting movement of the bag in each direction.

Only the pivoting out of the respective ends 14 of tilting levers 13 from the respective run-through grooves 15 enables a tilting of the bag and therefore the releasing of the bag from the attachment means on the luggage carrier. For this, the two receiving devices 3, 4 have a shared handle 18, which on actuation draw the ends 19 of the tilting levers 13 upwards. With traction on the handle 18, the tilting lever 13 of the right-hand receiving element 3 is rotated towards the left, whereas the tilting lever of the left-hand receiving element 4 is rotated towards the right. In so doing, the ends 14 of the two receiving elements 3, 4, which are arranged in a mirror-inverted manner, move respectively upwards and respectively completely free the run-through grooves of the receiving elements. The bag can now be simply tilted out from the receiving elements without having to lift it upwards. The receiving elements 3, 4 are configured as a unit as shown, each with a base plate (25), the tilting lever (13) and of a cover plate (17).

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. An attachment fastening locking system, for a container on an attachment device for a carrier on which attachment points are attached corresponding to at least two upper receiving elements arranged on said container and detachably fasten the container to the carrier in a defined position by means of at least one lower guide element attached on a rear side of the container and by means of said two upper receiving elements attached to the rear side of the container; comprising:

said two receiving elements being a respective left-hand receiving element and right-hand receiving element, each attached in an upper region to the rear side of the container and arranged spaced along a common arc path and each further including a substantially continuous guide groove arrayed along said common arc path;

said container including a mushroom-shaped attachment arrayed proximate said common arc path; and each said receiving element comprising:

a projection for receiving a corresponding mushroom-shaped attachment means, which is arranged on and extending from the carrier;

a spring-loaded tilting lever having a spring exerting a spring force and coaxially mounted for rotation about a pivot axis;

a one end of each said spring-loaded tilting lever extending in a direction of a defined top edge of the container and another opposing beveled end oriented along one direction and pivotably extending into the guide groove; and a projection on said spring-loaded tilting lever of said receiving element proximate said beveled end displacable in only one direction against the spring force upon an urging engaging receipt by respective said mushroom-shaped attachment means urged along said guide groove.

2. The attachment fastening locking system, according to claim 1, wherein:

said left-hand receiving element is configured such that as said mushroom-shaped attachment means is guided in the groove, under said urging engaging receipt movement along said common arc path from left to right said mushroom-shaped attachment means lifts the beveled end of the spring-loaded tilting lever and passes the lever end; and the lever end is configured in a blunt manner and blocks by means of the urging spring force the mushroom-shaped attachment means, running in the groove, against a back-orientation of the receiving element towards the left.

3. The attachment fastening locking system, according to claim 1, wherein:

a right-hand receiving element is configured such that as said mushroom-shaped attachment means is guided in the groove, under said urging engaging receipt movement along said common arc path from right to left said mushroom-shaped attachment means lifts the beveled end of the spring-loaded tilting lever and passes the lever end; and the lever end, is configured in a blunt manner and blocks by means of the spring force the mushroom-shaped attachment means, running in the groove, against a back-orientation of the receiving element towards the right.

4. The attachment fastening locking system, according to claim 1, further comprising:

an extending device having a first end and a second opposed end;

said extending device extending between each said tilting lever of each said receiving element; and wherein an actuation of said extending device simultaneously actuates each respective said receiving element and releases the respective mushroom-shaped attachment means in each respective groove.

5. The attachment fastening locking system, according to claim 4, wherein:
said spring element is a leg spring on the rotation axis of the tilting lever.

6. The attachment fastening locking system, according to claim 1, wherein:
each said receiving element is configured as a unit of a base plate, the tilting lever and of a cover plate.

7. The attachment fastening locking system, according to claim 1, wherein:
a guide base plate of the guide element and a base plate of said receiving element are each connected in a water-tight manner to a rear side of the container.

8. The attachment fastening locking system, according to claim 7, wherein:
a guide base plate of the guide element and a base plate of said receiving element are each connected in said water-tight manner to a rear side of the container by a welding.

9. The attachment fastening locking system, according to claim 5, wherein:
the extending device is a cable pull extending between each said upwardly oriented end of the tilting levers.

10. The attachment fastening locking system, according to claim 9, wherein:
the extending device is a carry grip.

11. The attachment fastening locking system, according to claim 1, wherein:
the lower guide element is arranged on the rear side of the container and is configured with a run-up chamfer.

12. The attachment fastening locking system, according to claim 1, wherein:
the common arc path, along which the upper receiving elements and the guide grooves are arranged is an arc portion of a circle with center point on the lower guide element and relative radius distance defined between said lower guide element and respective said receiving elements.

* * * * *